W. C. BUELL, Jr., AND J. W. GRISWOLD.
HEATING FURNACE.
APPLICATION FILED APR. 23, 1918.

1,344,438.

Patented June 22, 1920.
5 SHEETS—SHEET 2.

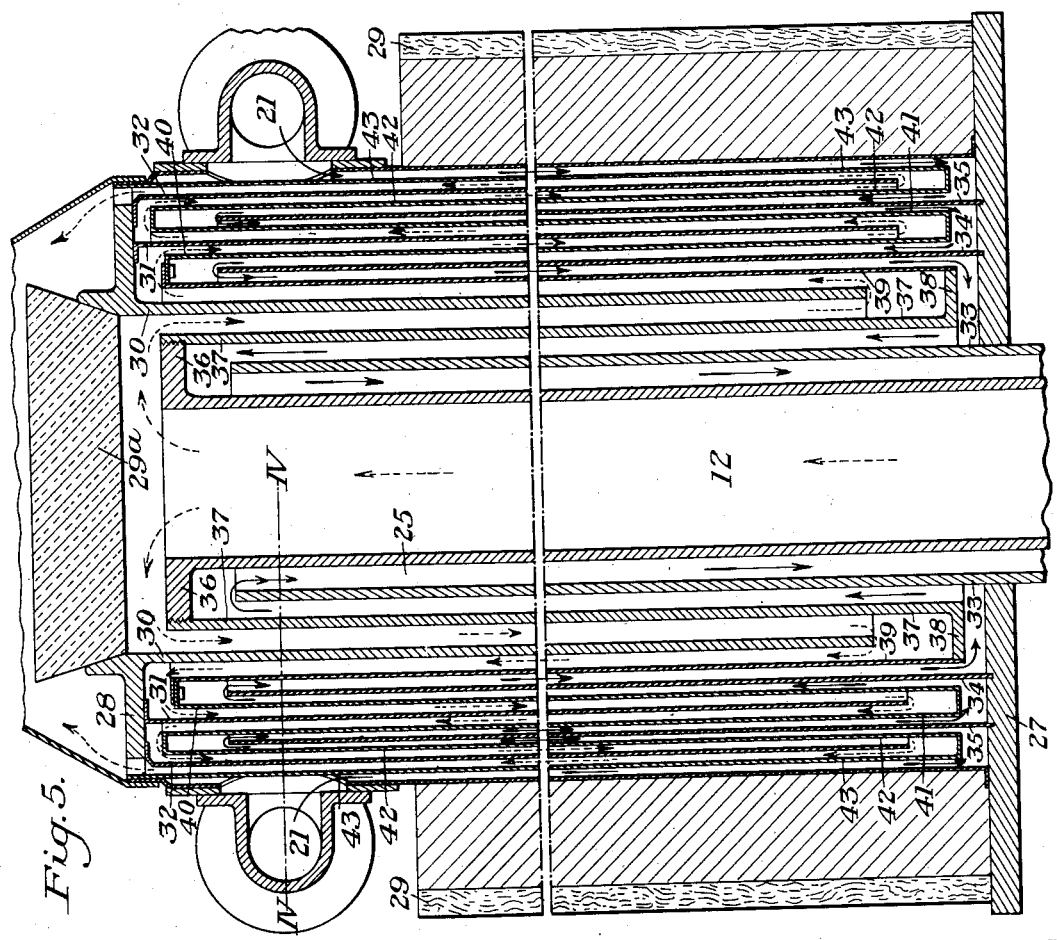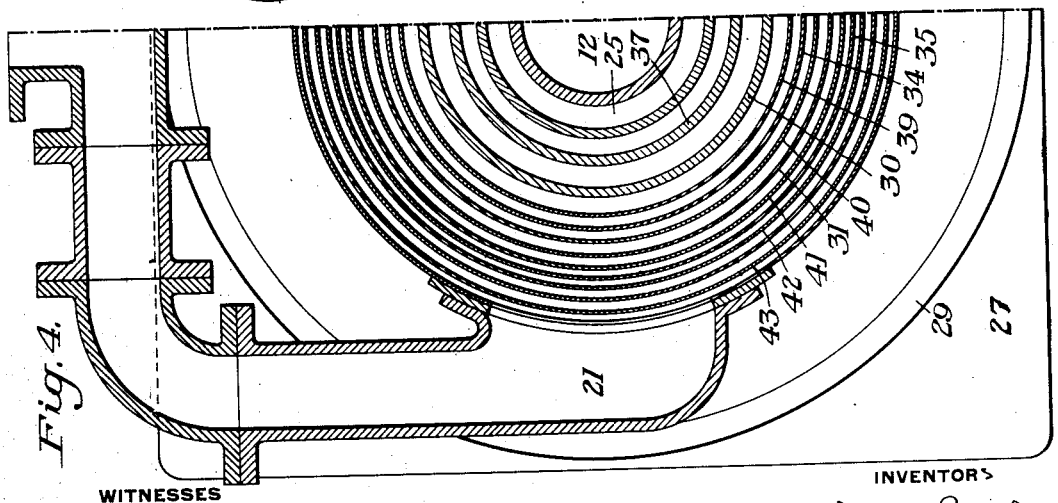

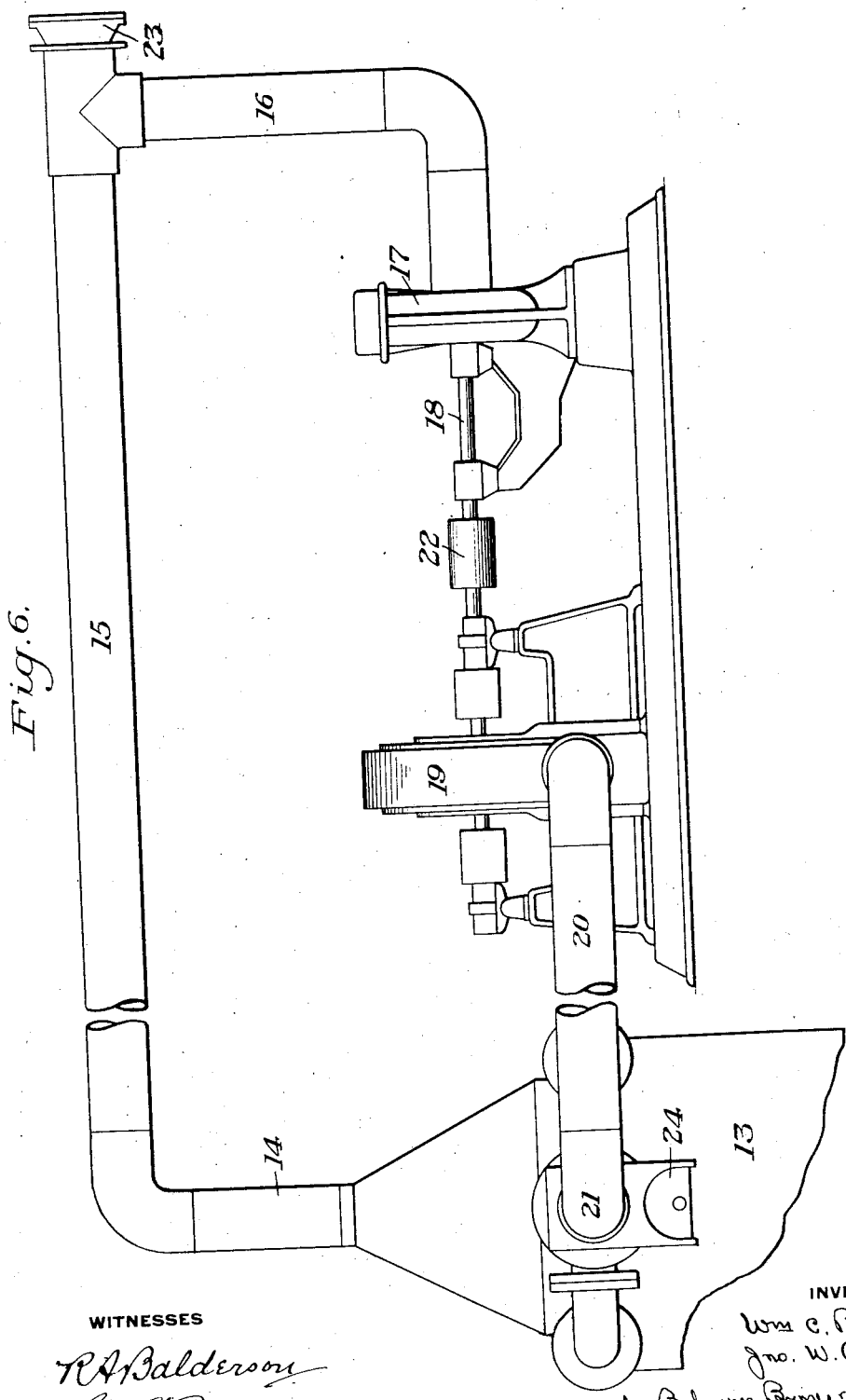

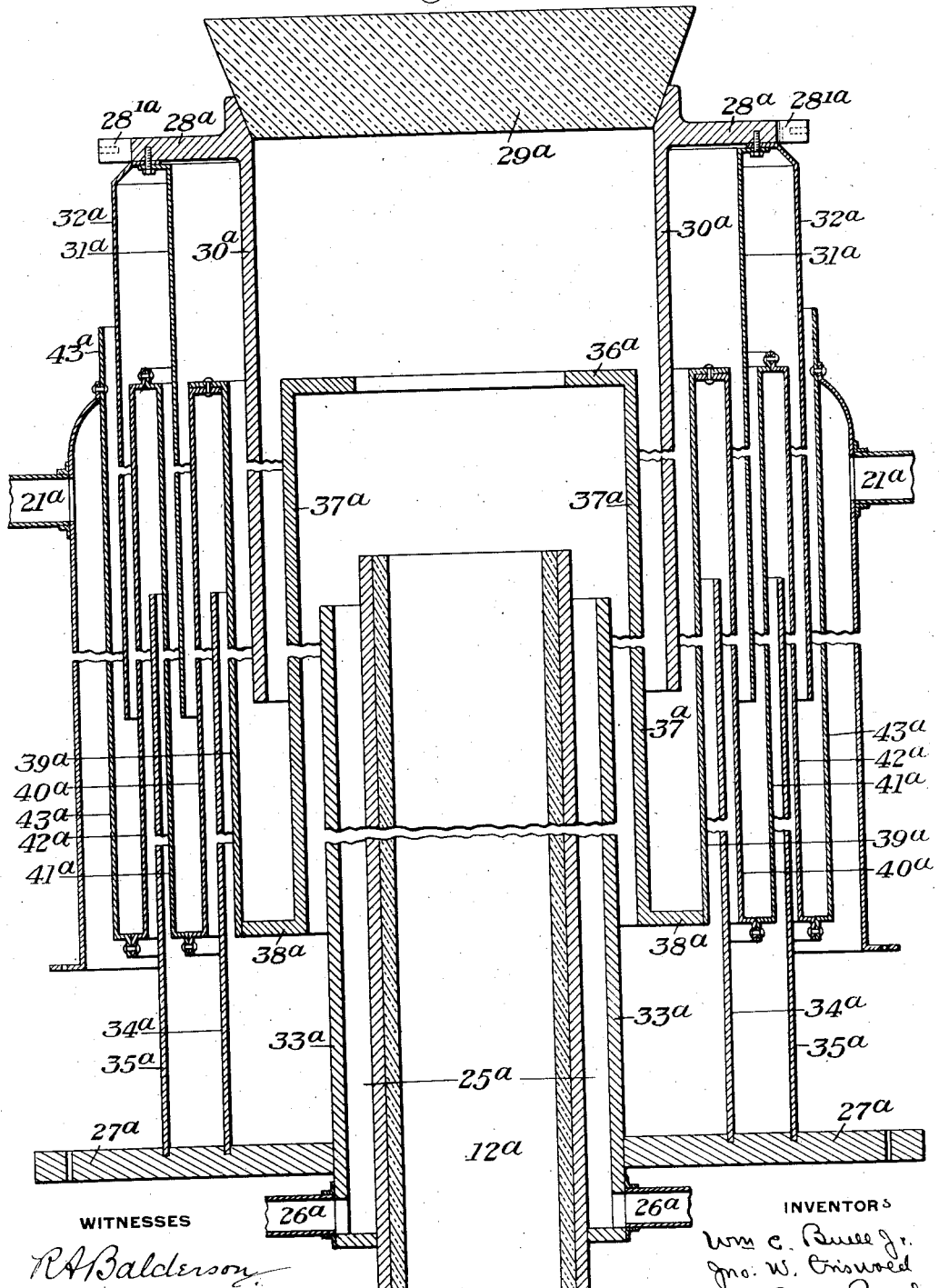

UNITED STATES PATENT OFFICE.

WILLIAM C. BUELL, JR., OF OSBORNE BOROUGH, PENNSYLVANIA, AND JOHN W. GRISWOLD, OF TOLEDO, OHIO, ASSIGNORS TO HENRY L. DOHERTY AND COMPANY, OF NEW YORK, N. Y., A COPARTNERSHIP COMPOSED OF HENRY L. DOHERTY AND FRANK W. FRUEAUFF.

HEATING-FURNACE.

1,344,438.    Specification of Letters Patent.    Patented June 22, 1920.

Application filed April 23, 1918. Serial No. 230,325.

*To all whom it may concern:*

Be it known that we, WILLIAM C. BUELL, Jr., of Osborne borough, Allegheny county, Pennsylvania, and JOHN W. GRISWOLD, of Toledo, in the county of Lucas and State of Ohio, both citizens of the United States, have invented a new and useful Improvement in Heating-Furnaces, of which the following is a full, clear, and exact description, reference being had to the accompanying drawings, forming part of this specification, in which—

Fig. 4 is a half cross section on the line IV—IV of Fig. 5.

Fig. 5 is a vertical section of the recuperator.

Fig. 6 is a side elevation showing the balancing system for supplying air to the burners and exhausting the products.

Fig. 7 is a detail view of a portion of the recuperator, and

Fig. 8 is a vertical section of the recuperator partly disassembled.

Figure 1:
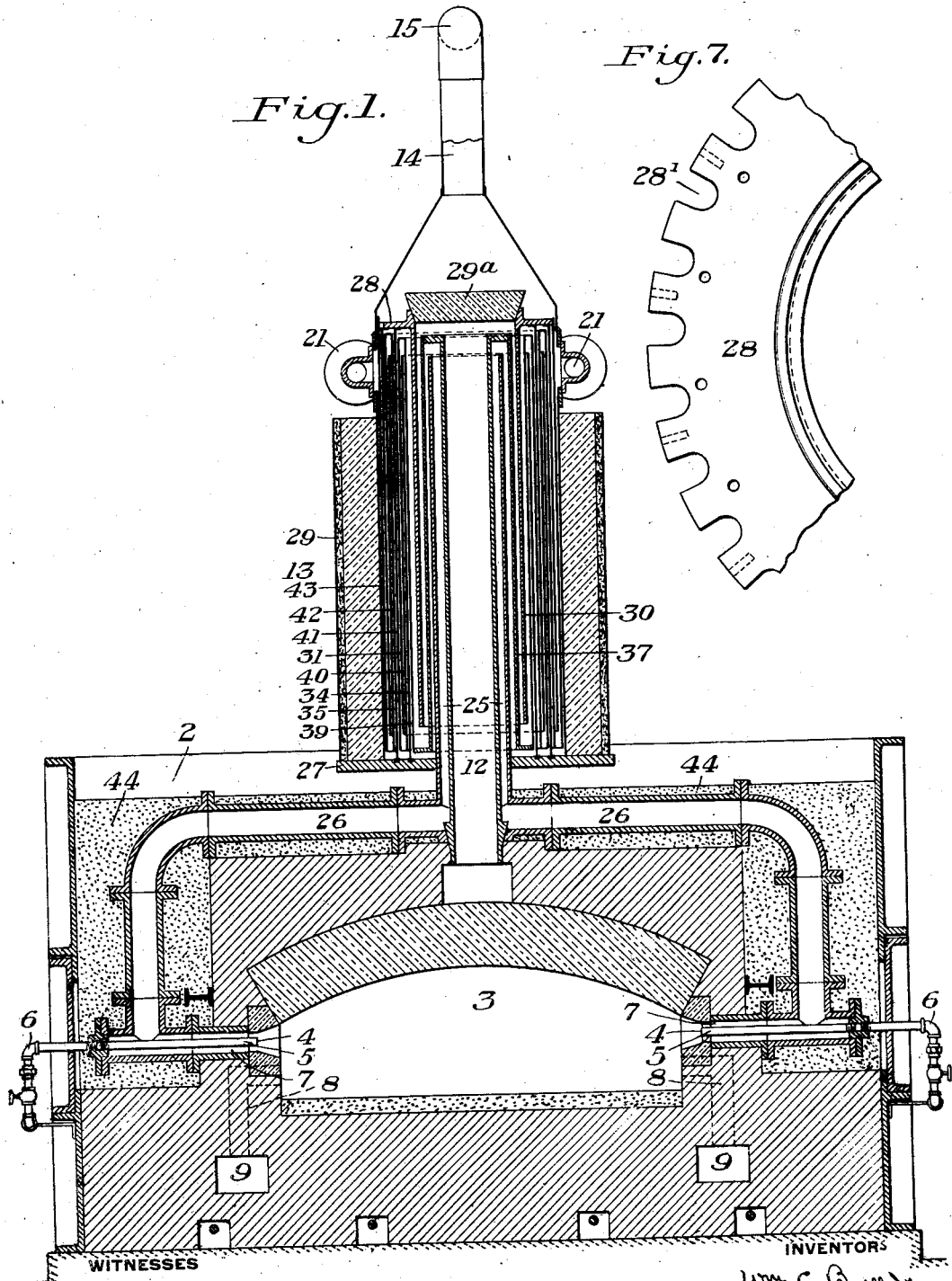
Figure 1 is a cross section showing one form of heating furnace constructed in accordance with our invention.
Figure 2:
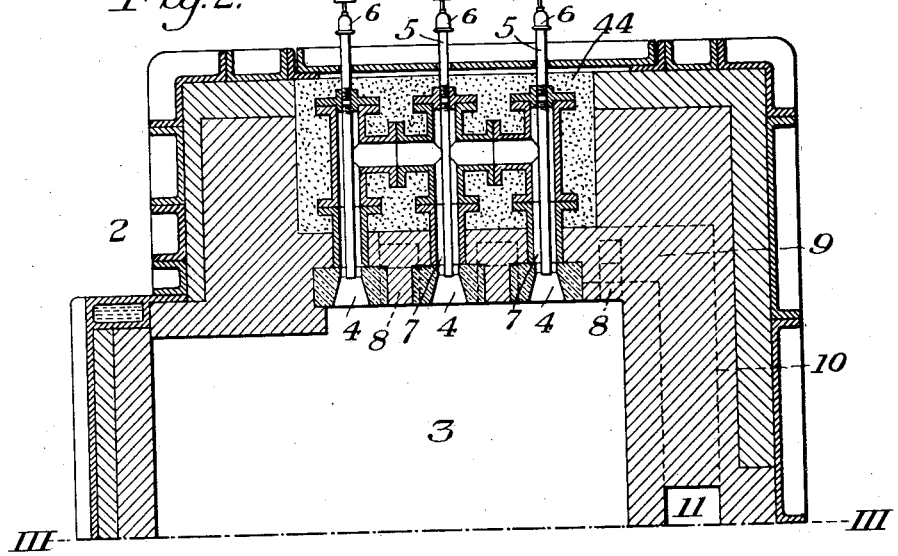
Fig. 2 is a horizontal cross section showing one-half of the furnace.
Figure 3:
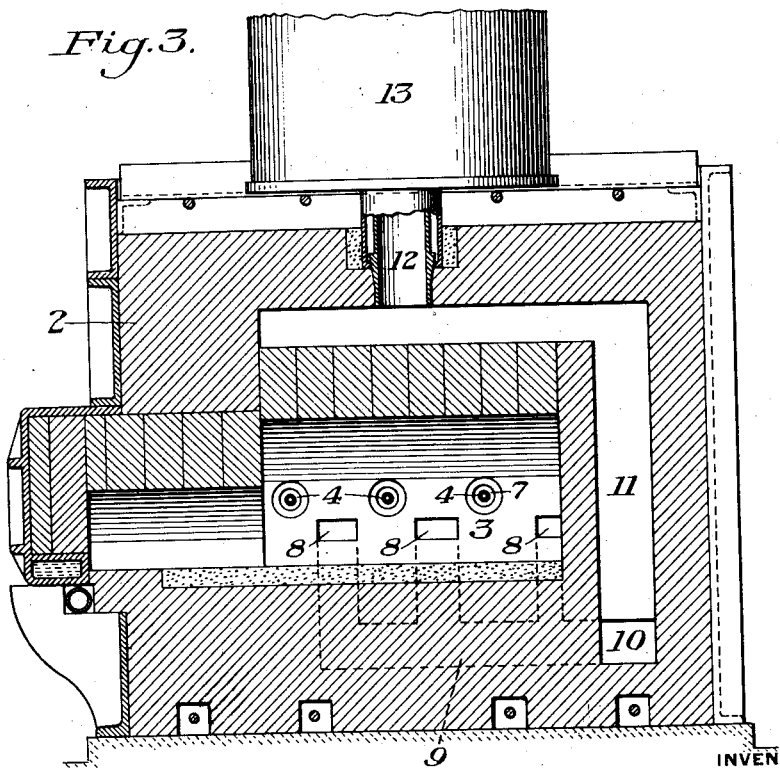
Fig. 3 is a vertical longitudinal section on the line III—III of Fig. 2 showing the recuperator in elevation.

Our invention relates to heating furnaces such as those used for heating small forgings, etc.

The object of the invention is to increase the efficiency of the furnace by a recuperator system and at the same time to provide what we term a balanced draft furnace in which the flames may be kept within the furnace by maintaining a substantially constant atmospheric pressure within the furnace. To that end, the invention consists in a heating furnace having pressure burners and a recuperator system to which is connected an exhaust device for withdrawing the products of combustion, provision being made for maintaining a suitable balance between the burner pressures and the exhaust device so as to maintain the substantially constant atmospheric pressure in the furnace and prevent the flames passing out of the furnace when the doors are open, this also preventing indrafts of cold air into the furnace.

The invention also provides a simple and effective form of recuperator which is easily assembled and taken apart and is of special utility in connection with such heating furnaces.

In the drawings, referring to the form of Figs. 1 to 7, inclusive, 2 represents a heating furnace having a combustion chamber 3 on the floor of which the forgings or materials to be used are placed. The fuel may be gaseous, liquid, or powdered coal. In the form shown, the furnace is adapted to burn gas and six burners 4 are provided, three entering the furnace chamber on each side thereof. Each burner is shown as having a gas pipe 5 supplied with gas from a valved gas pipe 6, the pipe 5 being concentric and surrounded by the air-duct 7. The products of combustion leave the furnace chamber through ports 8, shown as arranged in groups of three on each side of the furnace below and in staggered relation to the burner openings, each set of three leading into a common flue 9. The flues 9 lead into a rear flue 10 from which a flue 11 leads through the furnace wall and the roof of the furnace to the central vertical flue 12 of the recuperator in which there is an interchange of heat between the waste products and the air supplied to the furnace. This recuperator, designated generally by the numeral 13, is shown as supported over the top of the furnace and arranged on the counterflow principle, the air flowing inwardly through concentric channels alternating with concentric channels through which the waste products flow outwardly. The waste gases, after passing through the recuperator, rise through an offtake flue 14 and pass through pipes 15 and 16 to an exhaust fan 17 mounted on shaft 18. On this shaft is also mounted the blower 19, by which air is forced through the pipe 20 to the air inlets 21 of the recuperator. The shaft 18 may be driven in any suitable manner; for example, by an electric motor or by a belt leading to a pulley 22 thereon. 23 is a damper for regulating the suction of the exhauster 17, while 24 is a blast gate for regulation of the entering air. As the exhauster and blower are mounted on the same shaft, they are synchronized in movement and by suitably setting the dampers, a substantially constant atmospheric pressure may be maintained in the furnace, giving a balanced draft, which improves the efficiency and prevents flames shooting out and troubling the workmen. The recuperator gives, of course, a considerable draft drop in the outflow of the gases, and the inflow of the air and the blower and exhauster overcome this resistance of flow and provide efficient means of balancing the draft, these furnaces being ordinarily used without connection to a stack.

The recuperator shown is a double-surface recuperator in which the air and gases form concentric layers, each layer inclosing the next layer inside. While it is preferable, on account of economy in construction, to make the baffles and partitions of the recuperator cylindrical, nevertheless they may be made square or of any other desired shape, the term concentric being one of definition and not of limitation, to designate an arrangement of inclosing passages, one surrounding the other.

In the recuperator shown in detail in Figs. 4 and 5, the central waste gas flue 12 is surrounded by the air passage 25 from the lower end of which the conduits 26 lead the air to the burners, as shown in Fig. 1. The flue 12 may or may not be lined with refractory material. The recuperator has a bottom plate 27, a top plate 28 having notches 28', and is preferably provided with an insulating jacket 29 to conserve the heat. The annular top plate 28 preferably has a central opening closed by a recuperator plug 29ª and is provided with downwardly projecting baffle plates 30, 31 and 32. The bottom plate 27 is provided with three upwardly projecting baffle plates 33, 34 and 35. The upper end of the flue 12 is connected by an annular flange 36 to depending cylinder 37, which in turn is provided with flange 38 to connect with upwardly projecting cylinder 39, which, at its top, is correspondingly joined to depending cylinder 40. Depending cylinder 40 is joined at its bottom to upwardly extending cylinder 41, which in turn is joined at its top to downwardly extending cylinder 42 and the latter is in turn connected to upwardly extending cylinder 43, the top of which is connected to the dome-shaped portion of the offtake flue.

With this construction it will be seen that the gases flow outwardly through successive up and down passes, while the air flows inwardly through successive up and down passes, the two sets of passes alternating and enveloping each other. The flues are preferably formed of metal plates, or sheets, thus giving efficient heat transfer between the gases and the air with a comparatively large heating area. The outside air passage entirely surrounds the recuperator and prevents loss of heat, the cold air passing and absorbing the heat which would otherwise be dissipated through the outer wall.

In Fig. 8, we show a slightly modified form of recuperator of the same general type as shown in the first form, the plates, however, being riveted together at the ends, as shown, and the parts being arranged so that they can be readily separated and the top of the recuperator lifted off, carrying its partitions. The course of the waste gases and the air is indicated in Fig. 5, the solid line arrow showing the course of the air and the dotted line arrow the course of the waste gases.

The top and sides of the furnace are preferably surrounded by a packing 44 of heat insulating material, the air supply pipes to the burners being preferably embedded therein. In this the parts corresponding to those previously described are given the same reference characters with the letter "a" affixed thereto.

The double-surface recuperator automatically maintains a thermal self-regulation or balance between the heat in the combustion chamber and the heat imparted to the incoming air by the recuperator. If for any reason complete combustion does not take place in the combustion chamber, the combustion will be completed in the recuperator and this additional heat in the recuperator will in turn be imparted to the air passing through the recuperator to the combustion chamber and the air will enter the combustion chamber at a higher temperature, thus compensating for the loss in heat due to the imperfect combustion of the fuel in the combustion chamber. If, on the other hand, complete combustion takes place in the combustion chamber, no combustion will take place in the recuperator and the incoming air will be cooler. In short, as the combustion becomes less perfect in the combustion chamber the temperature of the incoming air will rise and as the combustion becomes more perfect the temperature of the incoming air will lower. A quick and direct transfer of heat between the outgoing gases and the incoming air is permitted by the thin walled recuperator, the heat transfer responding to variations of the temperature of the outgoing gases so as to continuously maintain the above mentioned thermal self-regulation.

The advantages of our invention will be obvious to those skilled in the art, since a simple, comparatively cheap and effective system is provided for saving a large amount of the waste heat from heating furnaces, while the balanced draft system also aids in this and prevents the flames emerging from the doors or other openings in the furnace.

We claim:

1. A heating furnace having a combustion chamber, a double-surface recuperator receiving the waste gases from said furnace on one side thereof and air for supporting combustion on the other side thereof, burners arranged to discharge into the combustion chamber, means for forcing air through the recuperator to said burners, mechanical exhausting means for withdrawing the waste gases from the combustion chamber through the recuperator, and means for adjusting the entering air pressure and the draft through the recuperator, substantially as described.

2. A heating furnace having a combustion chamber, a double-surface recuperator receiving the waste gases from said furnace on one side thereof and air for supporting combustion on the other side thereof, burners arranged to discharge into the combustion chamber, means for forcing air through the recuperator to said burners, a mechanical exhauster for withdrawing the waste gases from the combustion chamber through the recuperator, and means for adjusting the air pressure and draft to give a substantially balanced pressure in the combustion chamber, substantially as described.

3. A heating chamber having a combustion chamber, gas burners therefor arranged to discharge into the combustion chamber, a double-surface recuperator system, means for forcing air through the recuperator system to the burners, a mechanical suction device for exhausting the waste gases from the furnace through the recuperator, and means for correlating the exhaust device and the air-forcing device to give a substantially balanced pressure in the combustion chamber, substantially as described.

4. A heating furnace having a combustion chamber, means for forcing air through a double surface recuperator to the combustion chamber, and mechanical means for exhausting the waste gases from the furnace through the recuperator, said recuperator comprising a middle section built up of a plurality of spaced concentrically arranged connected plates, an end section comprising an end frame carrying a series of baffles extending between the plates, and a second end frame also carrying a series of baffles extending between the plates, said sections being removable; substantially as described.

5. A heating furnace having a combustion chamber, means for forcing air through a double surface recuperator to the combustion chamber, and mechanical means for exhausting the waste gases from the furnace through the recuperator, said recuperator having a plurality of heating surfaces, and a passage for the cold incoming air substantially surrounding the recuperator and thereby preventing dissipation of heat; substantially as described.

6. A heating furnace having a combustion chamber, means for forcing air through a double surface recuperator to the combustion chamber, and mechanical means for exhausting the waste gases from the furnace through the recuperator, said recuperator having a series of alternate and concentrically disposed air and gas passages through which the air and gases flow in generally inward and outward directions, respectively, whereby a continuous heat exchange is secured and dissipation of heat from the recuperator is prevented; substantially as described.

7. A heating furnace having a combustion chamber, means for forcing air through a double surface recuperator to the combustion chamber, and mechanical means for exhausting the waste gases from the furnace through the recuperator, said recuperator having a middle section formed of a plurality of concentrically disposed spaced heat conducting plates and two end sections having baffles fitting telescopically between the heat conducting plates; substantially as described.

8. A heating furnace having a combustion chamber, means for supplying air to the combustion chamber, mechanical means for exhausting the gases from the combustion chamber, and a continuous countercurrent recuperator through which the air and gases are continuously passed to effect a continuous heat exchange between them; substantially as described.

9. A heating furnace having a combustion chamber, means for forcing air through a double surface recuperator to the combustion chamber, and mechanical means for exhausting the waste gases from the furnace through the recuperator, said recuperator comprising a plurality of concentrically disposed spaced heat conducting plates having their alternate ends connected to form convolutions, and end plates having baffles fitting telescopically into each set of convolutions, respectively, said ends plates and baffles being removable; substantially as described.

10. A heating furnace having a combustion chamber, means for forcing air to the combustion chamber, mechanical means for exhausting gases from the combustion chamber, and a recuperator through which air and gases are passed, comprising an air passage, a gas passage, said air and gas passages being arranged in parallel and separated by comparatively thin diaphragms, substantially as described.

11. A heating furnace having a combustion chamber, a recuperator for handling air for combustion and gases of combustion, comprising an air passage, a gas passage, said air and gas passages being alternately arranged and in parallel, means for forcing air through the gas passage to the combustion chamber, and mechanical means for exhausting gases through the gas passage from the combustion chamber, said means being arranged to pass the gas and air in countercurrents, substantially as described.

In testimony whereof, we have hereunto set our hands.

WILLIAM C. BUELL, Jr.
JOHN W. GRISWOLD.